United States Patent [19]

Wada et al.

[11] 4,273,967
[45] * Jun. 16, 1981

[54] STYLUS FOR REPRODUCING CAPACITIVE VIDEODISC

[75] Inventors: Yoshiyo Wada; Kunio Goto; Hisao Kinjo, all of Yokohama, Japan

[73] Assignee: Victor Company of Japan, Limited, Yokohama, Japan

[*] Notice: The portion of the term of this patent subsequent to Apr. 22, 1997, has been disclaimed.

[21] Appl. No.: 31,035

[22] Filed: Apr. 18, 1979

Related U.S. Application Data

[63] Continuation of Ser. No. 852,366, Nov. 16, 1977, Pat. No. 4,199,782.

[30] Foreign Application Priority Data

Nov. 17, 1976 [JP] Japan .................................. 51-137216
Feb. 25, 1977 [JP] Japan .................................. 52-20065
Mar. 28, 1977 [JP] Japan .................................. 52-34106

[51] Int. Cl.³ .......................................... H04N 5/80
[52] U.S. Cl. ..................................... 369/126; 369/43; 369/50; 369/221
[58] Field of Search ................ 179/100.1 G, 100.1 B, 179/100.41 G, 100.41 R, 100.41 P; 358/128, 128.5; 274/38

[56] References Cited

U.S. PATENT DOCUMENTS

| 1,817,094 | 8/1931 | Moore ................................. 274/38 |
| 2,572,426 | 10/1951 | Andrews ...................... 179/100.41 R |
| 4,031,546 | 6/1977 | Leedom ....................... 179/100.41 G |
| 4,098,030 | 7/1978 | Fuhrer ................................. 274/38 |
| 4,104,832 | 8/1978 | Keiger ................................. 274/38 |
| 4,124,867 | 11/1978 | Fuhrer ................................. 358/128 |

Primary Examiner—John H. Wolff
Assistant Examiner—Alan Faber
Attorney, Agent, or Firm—Haseltine and Lake

[57] ABSTRACT

A reproducing stylus traces a track of a recording medium, in which track an information signal is recorded as variations of geometrical shape, and reproduces as variations in capacitance the information signal thus recorded. The reproducing stylus comprises a reproducing stylus main structure having a tip part with a flat sliding contact face for slidingly contacting a plurality of track of the recording medium at a time, and an electrode secured to the reproducing stylus main structre at the tip part thereof and adapted to trace one track and reproduce the information signal as the variations in capacitance in accordance with the variations in geometrical shape. The electrode has over a specific distance over the tip part of the stylus main structure from the extreme tip thereof, a constant width in the width direction of the track which is less than the width of the track. The extreme tip of the electrode has a flat or linear tip end contacting the track.

4 Claims, 18 Drawing Figures

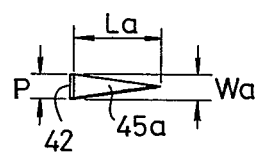
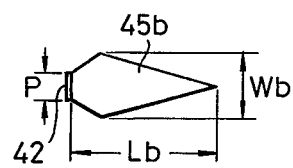
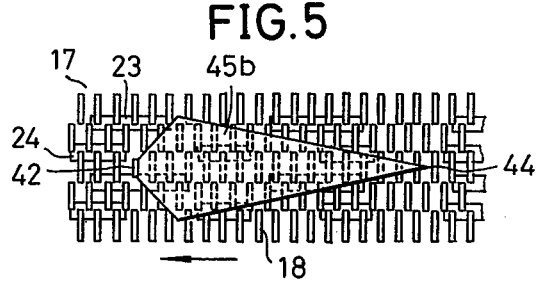
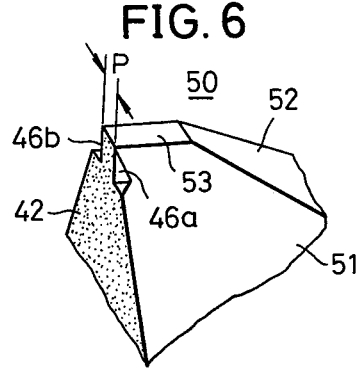
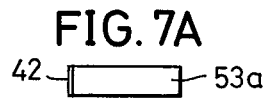
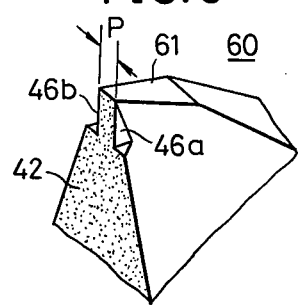

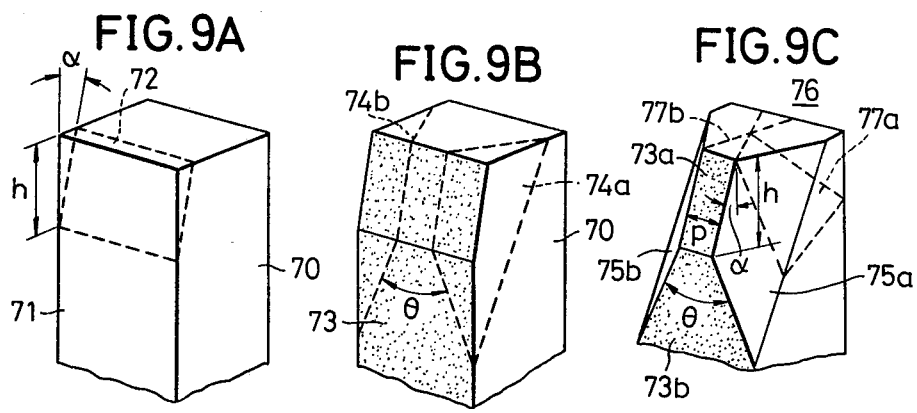
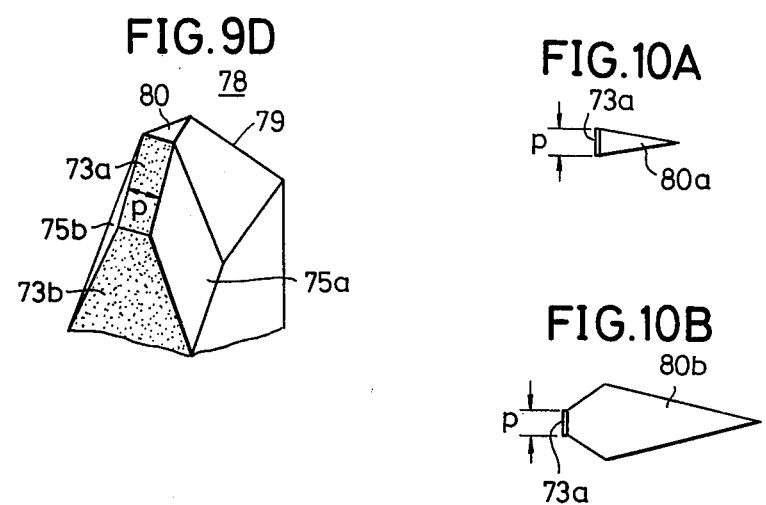
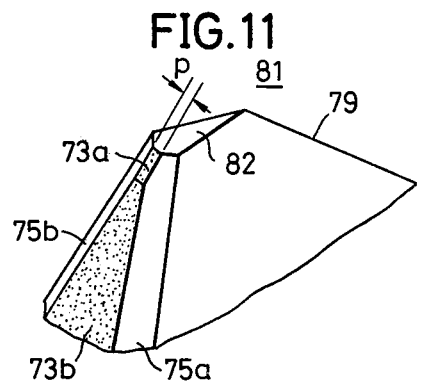

STYLUS FOR REPRODUCING CAPACITIVE VIDEODISC

This is a continuation of application Ser. No. 852,366 filed Nov. 16, 1977, now U.S. Pat. No. 4,199,782.

BACKGROUND OF THE INVENTION

The present invention relates generally to stylii for reproducing information signals recorded on information signal recording mediums. More particularly, the invention relates to a stylus for reproducing, as capacitance variation, an information signal recorded with high density as a variation in geometrical shape on an information signal recording medium of disc shape.

As one of systems, in which information signals such as video signals are recorded with high density on recording mediums of disc shape and are reproduced, there is a system which has been developed and reduced to practice, in its recording system, pits are formed along a track in accordance with an information signal in a recording medium substrate structure, and an electroconductive layer is adhered onto this substrate structure thereby to form a recording medium on which recording of the information has been completed. Then, in the reproducing system, this recording medium is rotated, and a reproducing stylus having an electrode is caused to trace relatively over and along the track of the medium. As a result, the elestrostatic capacitance between the electrode of the reproducing stylus and the electroconductive layer of the recording medium varies in accordance with the pits, whereby the information signal is reproduced in response to the variation of the capacitance.

Among the recording and reproducing systems of this so-called capacitance conversion type, there has been one in which, in its recording system, the pits are formed in accordance with the information signal on the bottom of a spiral groove in the surface of the recording medium, and, in the reproducing system, the reproducing stylus traces the track in a state wherein its stylus tip is within the spiral groove thereby to reproduce the information signal as variation of capacitance.

This known system, however, has had a drawback in that special reproducing modes of operation such as the so-called still reproduction, wherein a stopped picture is obtained by reproducing the recorded information of one revolution of the recording medium by repetition thereof through a plurality of revolutions, cannot be carried out. The reason for this is that, since the reproducing stylus is placed within the spiral groove in the recording medium, it would be forced to ride over the groove wall if an attempt were to be made to carry out this still reproduction. This would result in skipping of the stylus and also damage to the stylus and the groove wall of the recording medium. This case is true also in the slow motion picture and quick motion picture reproductions.

Another problem which has arisen in the prior art is due to the necessity of recording a video signal with high density on the recording medium since the information frequency band of a video signal, in general, is as large as 200 times that of an audio signal. For this reason, the width of the groove in the recording medium described above is made very narrow, being less than a number of $\mu$m. Moreover, since the reproducing stylus is continually in sliding contact with only one groove, the area of the stylus tip in contact with the groove is small, whereby the contact pressure acting on the stylus tip per unit area thereof is extremely great such as 10 mg/$\mu$m$^2$, for example. For this reason, the wear of the reproducing stylus and the recording medium is remarkably rapid and gives rise to drawbacks such as short serviceable life.

If the stylus contact pressure is decreased with the aim of reducing this wear, so-called stylus skipping will occur, and stable reproduction cannot be achieved. Furthermore, a decrease in the stylus contact force will give rise to problems such as an increase in the effect of dust and other foreign matter adhering to the recording medium.

Accordingly, we have previously proposed a system wherein, in the recording system thereof, pits are formed in accordance with the information signal being recorded along a spiral track on a recording medium of flat disc shape, without forming a groove therein, and, in the reproducing system, a reproducing stylus traces over and along this track thereby to reproduce the recorded information signal. This system is disclosed in the specification of our U.S. patent application Ser. No. 785,095 filed Apr. 6, 1977, entitled "Information Signal Recording and Reproducing System". In this proposed system, pilot signals are recorded on or in the vicinity of a track of the information signal such as video signal on a rotary disc. At the time of reproducing, the pilot signals are reproduced together with the video signal, and tracking servo control is carried out so that the reproducing stylus traces accurately along the track in response to the reproduced pilot signals.

By the use of this previously proposed system, since the recording track has no groove, there is no possibility whatsoever of the reproducing stylus or the recording medium being damaged, and the stylus can trace the same portion of the track repeatedly a plurality of times, whereby a special reproduction such as still, slow motion, or quick motion reproduction becomes possible. Furthermore, while it is necessary for the electrode of the reproducing stylus to trace along only one track, a sliding contact surface of the main structure of the reproducing stylus for contacting with the recording medium can be made flat and with a wide width without being restricted by the width dimension of the recorded track, since the recorded track has no groove. For this reason, the rates of wear of the reproducing stylus and the recording medium are low, and the serviceable lives thereof are prolonged.

A conventional reproducing styius used in systems such as the above described system previously proposed has the shape of a truncated triangular pyramid, an electrode being provided on one of its faces. For this reason, as this known reproducing stylus becomes worn with use, the width of the part thereof with the electrode becomes progressively large in proportion to the wear. Then, when this width of the electrode part becomes greater than the track pitch interval between adjacent track of the recording medium, the electrode part of the stylus begins to trace and reproduce simultaneously two adjacent tracks. As a consequence, beats occur in the reproduced signal, and the stylus becomes worthless for practical use. Accordingly, when the width of the electrode part becomes close to the track pitch interval, the life of the reproducing stylus ends. Therefore, while this conventional reproducing stylus has a longer life than the reproducing stylus of the system using a recording medium with a track groove, it is still accompanied by the problem of short life, which is of the order of a number of tens or hours, for example, in the case of a stylus having a main structure of sapphire.

SUMMARY OF THE INVENTION

Accordingly, it is a general object of the present invention to provide a novel and useful stylus for reproducing an information signal from a recording medium which stylus is free of the problems accompanying known reproducing styluses.

Another and specific object of the invention is to provide a stylus for reproducing an information signal from a recording medium which stylus has an electrode of a shape such that its electrode width remains constant as its wear progresses. By this provision, long time is required for the width of the electrode part in a direction of width of the track to become greater than the track pitch interval of the recording medium even when the wear of the electrode part has progressed to a great extent after a long period of use. For this reason the life of the reproducing stylus is greatly prolonged.

Still another object of the invention is to provide a stylus for reproducing an information signal from a recording medium which stylus is of a shape such that the width of its main structure increases in a proportion such as to become greater than the width of the electrode part as its wear progresses. Since the area of the contact face of the stylus tip increases with the progress of wear of the reproducing stylus, the stylus force per unit area becomes small, and the wear of the reproducing stylus and that of the recording medium are reduced. This also contributes to the prolonging of the life of the reproducing stylus.

A further object of the invention is to provide a stylus for reproducing an information signal from a recording medium which stylus can be easily and stably ground and can be easily produced.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIGS. 4A and 4B are plan views respectively showing the contact face of the reproducing stylus illustrated in FIG. 3 at the initial period of its use and after a long time of use;

FIG. 5 is an enlarged plan view indicating the state of retracing of a reproducing stylus over a rotary disc;

FIG. 6 is an enlarged perspective view of a second embodiment of a reproducing stylus according to the invention;

FIGS. 7A and 7B are plan views respectively showing the contact face of the reproducing stylus illustrated in FIG. 6 at the initial period of its use and after a long time of use;

FIG. 8 is an enlarged perspective view of a third embodiment of a reproducing stylus according to the invention;

FIGS. 9A through 9D are enlarged perspective views respectively showing a fourth embodiment of the reproducing stylus according to the invention in sequential stages of its fabrication;

FIGS. 10A and 10B are plan views respectively showing the contact face of the reproducing stylus shown in FIG. 9D at the initial period of its use and after a long time of use;

FIG. 11 is an enlarged perspective view showing an example of modification of the reproducing stylus illustrated in FIG. 9D.

DETAILED DESCRIPTION

Figure 1A:
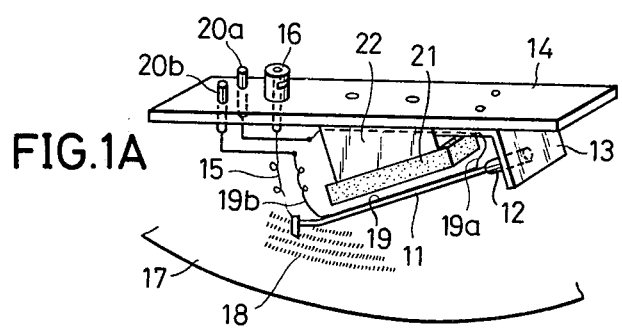
FIG. 1A is a perspective view showing one example of a reproducing transducer to which the reproducing stylus according to the invention can be applied.

One example of a reproducing transducer to which a reproducing stylus of the invention can be applied will now be described with reference to FIG. 1A. A cantilever 11 having at its free end a reproducing stylus 10 is mounted at its proximal end via a damper 12 on a bracket 13. The bracket 13 is secured to a support plate 14 mounted on a re-entrant cylindrical cavity resonator (not shown).

The reproducing stylus 10 comprises a stylus structure made of diamond or sapphire and an electrode consisting of an electroconductive film adhered onto the end face of the stylus structure, as described hereinafter. This electrode is connected through a very thin lead wire 15 which is flexible and slackened to a terminal 16 provided on the support plate 14. As the reproducing stylus 10 traces along a track on a rotary disc 17, the video signal recorded thereon as variation of pits is reproduced as variation in the electrostatic capacitance between the surface of the rotary disc 17 and the electrode of the reproducing stylus 10.

In the case where there are fluctuations of the rotating surface of the rotary disc 17, the reproducing stylus 10 moves in a path as viewed in side view which is, strictly speaking, an arc of a circle. However, since the amplitude of the rotating surface fluctuation is of the order of 100 $\mu$m, it may be assumed, when the length of the cantilever 11 is selected at a value of the order of 30 mm., for example, that the reproducing stylus 10 undergoes an up-and-down following displacement in a substantially straight line in conformance with the rotating surface fluctuation.

A very thin gold wire 19 of a diameter of the order of 20 $\mu$m, for example, is bonded, except at its ends, by an instanteneous adhesive to the cantilever 11 over a specific distance in the longitudinal direction thereof. Lead wire parts 19a and 19b of the end parts of this gold wire 19 are respectively connected in a slackened state to terminals 20a and 20b provided on the support plate 14.

A permanent magnet 21 is secured by way of a bracket 22 to the lower surface of the support plate 14. The wire 19 is thus disposed in this strong magnetic field formed by the magnet 21.

Figure 1B:
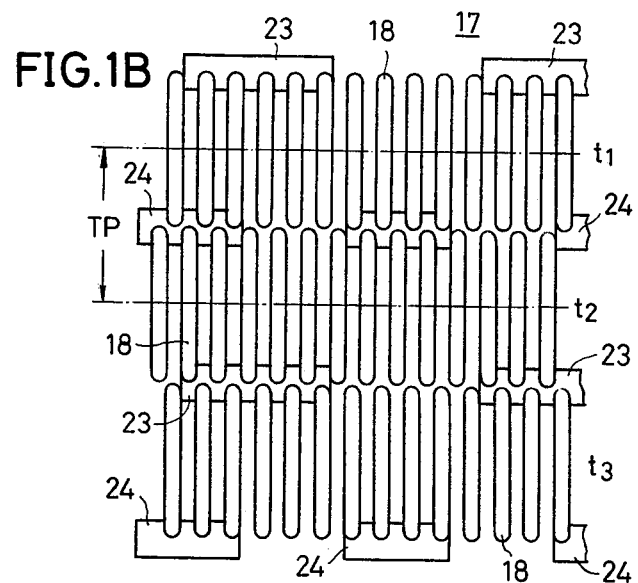
FIG. 1B is an enlarged plan view of one part of a track pattern of a rotary disc.

The rotary disc 17 has a plurality of pits 18 formed therein along a spiral track in accordance with the recorded video signal as shown in FIG. 1B. This track does not have a groove for guiding the reproducing stylus but consists merely of the pits 18 formed in the flat surface of the disc. The spiral track has successive track $t_1, t_2, t_3, \ldots$ arranged side-by-side, each being the track portion corresponding to one revolution of the rotary disc 17. At and along the lateral edges of each track, pits 23 and 24 of pilot signals of mutually different frequencies $f_{p1}$ and $f_{p2}$ are respectively formed in alternate staggered formation in the disc. One half of each of these pits 23 and 24 overlaps the end portions of a certain number of the pits 18 of the track, while the other half of the same pit overlaps the end portions of a certain number of the pits 18 of the contiguously adjacent track.

In the instant example, the rotary disc, which has a 12-inch diameter, is rotated at a speed of 900 rpm., and has a capacity of recording an information signal of approximately 30 minutes. The tracks are formed contiguously in side-by-side arrangement, and the track pitch is equal to the track width, being 2.6 $\mu$m., for example. Furthermore, the frequencies $f_{p1}$ and $f_{p2}$ of the pilot signals are respectively 511 KHz and 716 KHz, and the track width of the pilot signals is 0.6 $\mu$m. The rotary disc 17 comprises, for example, a disc substrate made of polyvinyl acetate (PVAC), in which the pits 18 are formed along the spiral track, a metal coating formed with a thickness of 400 Å, for example, on the disc substrate to constitute an electrode, and a dielectric coating film of a thickness of 400 Å adhered onto the metal coating. The disc may be caused to possess an electrode function by using another material instead of providing a metal coating film.

At the time of reproduction, the rotary disc 17 rotates, and the reproducing stylus 10 traces relatively the tracks $t_1, t_2, \ldots$, whereupon the recorded video signal and the pilot signals $f_{p1}$ and $f_{p2}$ are reproduced through the reproducing stylus 10. The reproduced signal thus picked up is supplied to a control signal generating circuit. A control signal is derived from the control signal circuit in accordance with the deviation of the reproducing stylus 10 from each track and supplied to terminals 20a and 20b.

When a control signal current flows through the terminals 20a and 20b and through the wire 19, a displacement force acts on the wire 19 in the transverse direction perpendicular to the longitudinal direction of the cantilever 11 in response to the above mentioned current, according to the Fleming's left-hand rule, since the wire 19 is disposed within the magnetic field due to the magnet 21. Since the wire 19 is bonded to the cantilever 11, the cantilever 11 is displaced by the force acting on the wire 19. As a result, the reproducing stylus 10 is displaced in a direction perpendicular to the longitudinal direction of the track, and tracking control is so accomplished that the reproducing stylus 10 traces accurately along the track.

Figure 2:
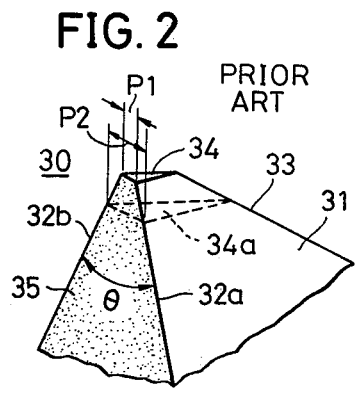
FIG. 2 is an enlarged perspective view of one example of a known reproducing stylus.

For the reproducing stylus 10, a reproducing stylus 30 of the shape shown in FIG. 2 has heretofore been used. This reproducing stylus 30 has a stylus main structure 31 made of a wear resistant material such as diamond or sapphire and having the shape of a triangular pyramid with three faces forming edge lines 32a, 32b, and 32c. The vertex part (which is the bottom part when the stylus is being used) is truncated and thereby has a contact face 34 for sliding on the rotary disc 17. One of the above mentioned faces is provided with an electrode 35 of a conductor of high electroconductivity such as, for example, hafnium or titanium, formed or adhered by sputtering.

This electrode 35 has the shape of a truncated triangle defined by the edge lines 32a and 32b forming an angle $\theta$ therebetween. That is, this electrode 35 possesses a shape which is the same as the shape which results when the reproducing stylus main structure 31 is projected onto a plane parallel to the electrode 35. The tip angle $\theta$ of the stylus main structure 31 is selected at approximately 40 degrees, since if it is made too small, the stylus main structure 31 will chip or break. For this reason, when the reproducing stylus 30 is used with its sliding contact face 34 in contact with the rotary disc 17, and as the stylus tip becomes progressively worn, the width of the electrode 35 in the direction of the width of the track of the rotary disc at the sliding contact face 34 increases in proportion to the magnitude of the wear. For example, during the initial period of use, the width of the electrode 35 at the sliding contact face 34 is P1, but, as the wear progresses as indicated by the sliding contact face 34a shown by broken line, the width of the electrode 35 becomes large as indicated at P2 in FIG. 2.

When the width P2 of this electrode 35 becomes greater than the dimension of the track pitch TP of the tracks $t_1, t_2, t_3, \ldots$ on the rotary disc 17, the adjacent tracks are simultaneously reproduced. For this reason, the reproducing stylus becomes useless, and its serviceable life terminates. Consequently, the life of this known reproducing stylus has been relatively short.

The manner in which the difficulties associated with the above described known reproducing stylus are overcome in the reproducing stylus according to the present invention will be apparent from the following description with respect to preferred embodiments of the invention. In this specification and the appended claims, the widths of the electrode and the slide contact face of the reproducing stylus main structure are their widths in the width direction of the track of the rotary disc. The length of the sliding contact face is its length in the extending direction of the track.

Figure 3:
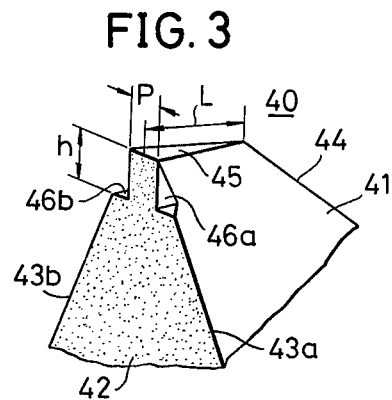
FIG. 3 is a similar enlarged perspective view of a first embodiment of a reproducing stylus according to the invention.

In a first embodiment of the reproducing stylus according to the invention as shown in FIG. 3, a reproducing stylus of a shape similar to that of the known stylus illustrated in FIG. 2 is first obtained in the fabrication of a reproducing stylus 40. First, an electrode 42 of a film thickness of the order of 1,000 Å to 2,000 Å, for example, is formed by applying a film of an electroconductor such as hafnium or titanium by sputtering on one face of a stylus main structure 41 formed from diamond or sapphire. Next, the stylus main structure is so ground that it acquires two other faces which, with the face of the electrode 42, form edge lines 43a and 43b and mutually form an edge line 44. In addition, the vertex part of the main structure 41 is so ground that the width of the electrode 42 becomes a prescribed width P thereby to form the sliding contact face 45. Thus a stylus main structure of a shape substantially similar to that shown in FIG. 2 is obtained.

Then the parts of this stylus main structure 41 at the upper ends of the edge lines 43a and 43b are ground off, together with the corresponding parts of the electrode 42, in a manner such that the width of the electrode 42 in the vicinity of the sliding contact face 45 is constant at the above mentioned value P over a predetermined distance h (for example, several $\mu$m or more) extending downward from the sliding contact face 45, thereby forming cutout recesses 46a and 46b. Thus, the reproducing stylus 40 of the first embodiment of the invention is obtained.

The sliding contact face 45 (which becomes the bottom face during use) is flat including the foremost tip of the electrode 42 and, at the initial period of use of the reproducing stylus 40, is of triangular shape as shown by the sliding contact face 45a in FIG. 4A. When the stylus 40 is used for a long time, the electrode 42 and the stylus main structure at its tip become worn, and the sliding contact face assumes a pentagonal shape 45b as shown in FIG. 4B. However, even in this worn state of the stylus, the width of the electrode 42 is still preserved at the constant value P since the width of the stylus tip, together with the width of the electrode 42, is of the constant value P over the distance h as described above. Therefore, even when the stylus tip becomes considerably worn after a long period of use, the width of the electrode 42 does not become greater than the track width, whereby the life of the reproducing stylus is prolonged.

Furthermore, as the stylus tip becomes worn, the width and length of the sliding contact face 45 respective increase from Wa to Wb and from La to Lb as will be apparent from a comparison of FIGS. 4A and 4B, whereby the area of the sliding contact face increases. As a result, the stylus contact pressure per unit area of contact is greately reduced to 1 mg/$\mu$m$^2$, for example, and this reduction of the stylus contact pressure also contributes to the prolonging of the life of the reproducing stylus and the life of the rotary disc.

However, if the length Lb of the worn sliding contact face 45b becomes excessively long, it will give rise to a phenomenon wherein the tip of the electrode 42 separates from the rotary disc 17 as the reproducing stylus 40 undergoes up-and-down movement (strictly speaking an arcuate up-and-down movement) in conformance with the surface undulations of the rotary disc 17. Consequently stable and accurate reproduction can no longer be carried out. Accordingly, this phenomenon also determines a practical limit to the life of the reproducing stylus, and the life ends when this length Lb exceeds 20 $\mu$m., for example.

The tracing state of the stylus tip in its worn condition relative to the track on the rotary disc 17 up to the time when the sliding contact face 45 thereof assumes the shape shown in FIG. 4B is indicated in FIG. 5. In the instant embodiment of the invention, the track pitch TP is, for example, 2.6 $\mu$m., and the electrode width P is selected at 1.5 to 2.0 $\mu$m. In this connection, the part of the worn sliding contact face 45b constituted by the main structure 41 of the reproducing stylus is straddling over a plurality of track turns, but since the electrode occupies only the part designated by reference numeral 42, there is no detrimental effect due to this state of the stylus main structure 41. On the contrary, it affords the above described beneficial effect.

In a second embodiment of the invention as illustrated in FIG. 6, the reproducing stylus 50 has an electrode 42 which is caused to have a constant width P over a specific distance as a result of the provision of cutout recesses 46a and 46b similarly as in the preceding first embodiment of the invention. The main structure 51 of this reproducing stylus has an inclined face 52 in addition to the face onto which the electrode 42 is adhered and the two flank faces, the face 52 being on the side opposite the face bearing the electrode 42. The sliding contact face 53 of the vertex part or tip of the stylus has a rectangular shape as indicated in FIG. 7A at the initial period of use. When the stylus tip becomes worn after a long period of use, the sliding contact face assumes a shape as designated by 53b of increased width and length in FIG. 7B. The width of the electrode 42, however, remains at its contant value P.

In the case of the preceding first embodiment of the invention, since the part of the stylus at the edge line 44 constitutes the leading part of the stylus in the direction of tracing relative to the rotary disc 17 rotating in the arrow direction in FIG. 5, the stylus has the capability of removing dust on the rotary disc as a result of the action of this edge line part 44. While the stylus of this second embodiment of the invention does not have a dust removing capability comparable to that of the first embodiment of the invention, the possibility of chipping of the stylus during the grinding fabrication process is less. Furthermore, it has the advantageous possibility of making the area of the sliding contact face greater.

While in the second embodiment of the invention, the sliding contact face 53 is initially a rectangle, it is also possible to use a sliding contact face of trapezoidal shape such as the face 61 of the reproducing stylus 60 constituting a third embodiment of the invention as illustrated in FIG. 8.

A fourth embodiment of the invention will now be described with respect to the sequence of the fabrication steps thereof. In the preceding first, second, and third embodiments of the invention, the work of forming the cutout recesses 46a and 46b is relatively difficult, and the yield of good quality stylii is not so good, whereby these reproducing stylii are accompanied by the problem of not being easily adaptable to mass production. In the instant fourth embodiment of the invention, the reproducing stylus is so adapted that all grinding steps can be carried out by planar grinding thereby to overcome the above mentioned problem.

First, as indicated in FIG. 9A, a stylus blank 70 of diamond or sapphire in the shape of a bar with a square cross section, each side dimension of which is of the order of 0.2 mm., is prepared. One lateral face 71 of this stylus blank 70 is ground to a mirror finish, and then a sloped first face 72 with an inclination angle $\alpha$ relative to the vertical direction is formed by grinding to a mirror finish over a specific vertical distance h from the end face (upper face as viewed in FIG. 9A) of the stylus blank.

Next, as indicated in FIG. 9B, hafnium is deposited by sputtering to form an electrode 73 on at least a second and the first faces 71 and 72. This electrode may be formed over the entire stylus blank having the sloped face 72 since the unnecessary parts of the stylus blank 70 are cut away in a subsequent process step. Parts 74a and 74b bounded and indicated by broken lines of the stylus blank in the state indicated in FIG. 9B are then removed by planar grinding, whereupon a reproducing stylus 76 of the shape shown in FIG. 9C is obtained. This removal of the parts 74a and 74b is so carried out that the width of the remaining electrode part 73a on the face 72 will be of a constant value P determined to be of proper relation with the aforementioned track pitch, and that the remaining electrode part 73b on the face 71 will be of trapezoidal shape with a vertex angle $\theta$ between the lateral sides of the order of 40 degrees. As a result, two new faces 75a and 75b are formed.

From the reproducing stylus 76 thus formed, parts 77a and 77b bounded and indicated by broken lines in FIG. 9C. are then removed by planar grinding, whereupon a reproducing stylus 78 of the shape shown in FIG. 9D is obtained. This reproducing stylus 78 has an edge line 79 between the lateral faces resulting from the removal of the parts 77a and 77b and a sliding contact face 80, which is of triangular shape 80a as shown in FIG. 10A at the initial period of use. As the stylus tip becomes worn, the width of the electrode part 73a continues to be of the constant value P, while both the width and length of the sliding contact face 80 increase as indicated by the face 80b in FIG. 10B.

A reproducing stylus 81 as illustrated in FIG. 11, which is a modification of the reproducing stylus 76 shown in FIG. 9D, has a sliding contact face 82 which, throughout its life from the initial period of use, has a shape as shown. In FIG. 11, those parts which are the same as or equivalent to corresponding parts in FIG. 9 are designated by like reference numerals, and description of such parts will be omitted.

Included within the scope of the present invention is the construction of a reproducing stylus whose sliding contact face has a width greater than the width of the electrode tip portion after use of the stylus, even though the width of the sliding contact face is equal to that of the electrode tip portion at the time of commencing of use.

Further, this invention is not limited to these embodiments but various variations and modifications may be made without departing from the scope and spirit of the invention.

What is claimed is:

1. A reproducing stylus for tracing a track of a recording medium, in which track an information signal is recorded as variations of geometrical shape, and for reproducing as variations in capacitance the information signal thus recorded, said reproducing stylus comprising:

a reproducing stylus main structure having a tip portion with a sliding contact face for slidingly contacting tracks of the recording medium; time an electrode disposed on the reproducing stylus main structure at the tip portion thereof for tracing the track and reproducing the information signal as variations in capacitance in accordance with the variations in geometrical shape, said reproducing stylus main structure having an electrode surface on which said electrode is disposed, and a pair of side surfaces defining opposite side edges of the electrode surface at least in the vicinity of the tip portion of the reproducing stylus main structure, said side edges being substantially parallel and spaced from one another, the spacing between said side edges being less than the width of said track.

2. A reproducing stylus for tracing a track of a recording medium, in which track an information signal is recorded as variations of geometrical shape, and for reproducing as variations in capacitance the information signal thus recorded, said reproducing stylus comprising:

a reproducing stylus main structure having a tip portion with a sliding contact face for slidingly contacting tracks of the recording medium; and an electrode disposed on the reproducing stylus main structure at the tip portion thereof for tracing the track and reproducing the information signal as variations in capacitance in accordance with the variations in geometrical shape, said reproducing stylus main structure having an electrode surface on which said electrode is disposed, a pair of first side surfaces converging from both side edges of the electrode surface, and at least a pair of second side surfaces defining recessed cutouts including portions of the electrode surface and the first side surfaces in the vicinity of the tip portion of the reproducing stylus main structure, said second side surfaces defining side edges of the electrode surface in the vicinity of the tip portion thereof which are substantially parallel and have a spacing therebetween which is less than the width of the track.

3. A reproducing stylus for tracing a track of a recording medium, in which track an information signal is recorded as variations of geometrical shape, and for reproducing as variations in capacitance the information signal thus recorded, said reproducing stylus comprising:

a reproducing stylus main structure having a tip portion with a sliding contact face for slidingly contacting tracks of the recording medium; and an electrode disposed on the reproducing stylus main structure at the tip portion thereof for tracing the track and reproducing the information signal as variations in capacitance in accordance with the variations in geometrical shape, said reproducing stylus main structure having a first electrode surface on which said electrode is disposed, a second electrode surface on which said electrode is disposed continuously from the first electrode surface and which is not in the same plane as said first electrode surface, and a pair of side surfaces defining respectively side edges of both the first and second electrode surfaces, said pair of side surfaces which define the side edges of the first electrode surface being arranged so that said side edges are substantially parallel and have a spacing therebetween less than the width of the track.

4. A reproducing stylus for tracing a track of a recording medium, in which track an information signal is recorded as variations of geometrical shape, and for reproducing as variations in capacitance the information signal thus recorded, said stylus having multiple facets comprising a tip of the stylus, one of the facets being disposed with an electrode which contacts at one end thereof a surface of the recording medium to reproduce the information signal, other two ends of the electrode being substantially parallel to each other so that the width of the electrode is maintained substantially constant at said one end despite wear of the tip, another of said facets being for slidingly contacting the surface of the medium and increasing its contacting area by enlarging its length in the direction of tracking as the wear progresses.

* * * * *